July 3, 1923.
P. WERTZ
SAFETY LOCOMOTIVE CAB VALVE
Filed Nov. 16, 1921
1,460,628
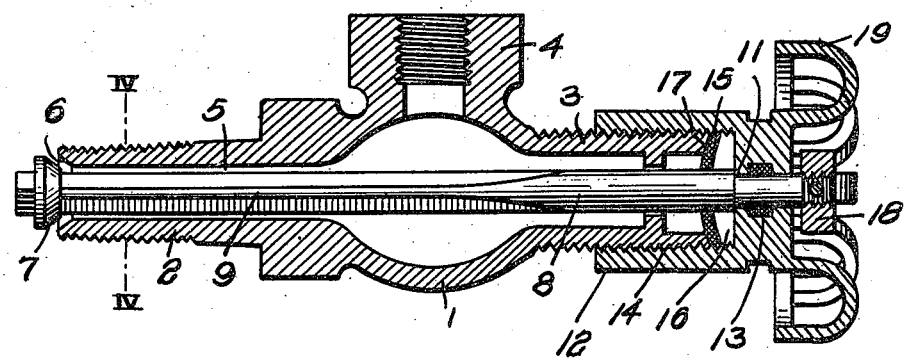
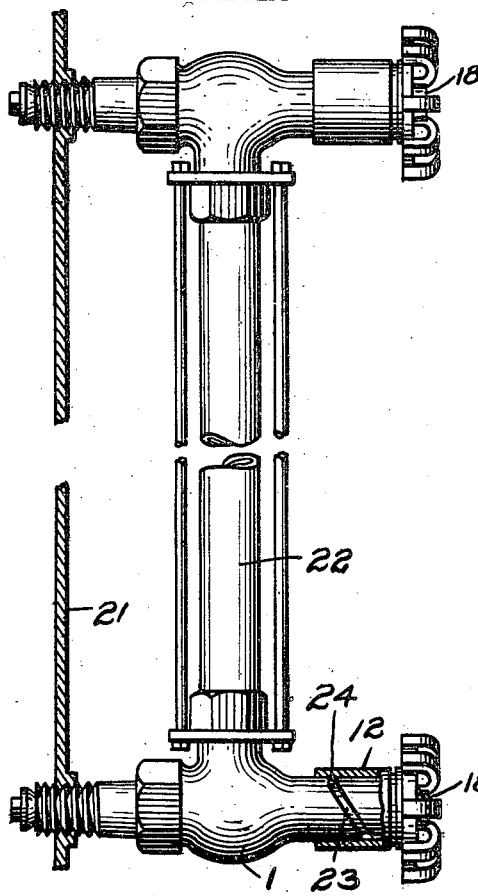
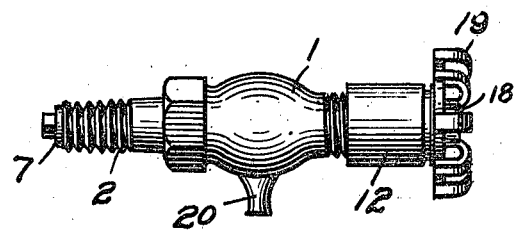
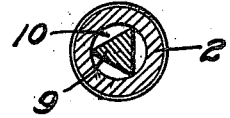
INVENTOR
Peter Wertz
By Winter & Brown
his Attys
WITNESSES
J. Herbert Bradley Patented July 3, 1923.

1,460,628

UNITED STATES PATENT OFFICE.

PETER WERTZ, OF PITTSBURGH, PENNSYLVANIA.

SAFETY LOCOMOTIVE-CAB VALVE.

Application filed November 16, 1921. Serial No. 515,649.

*To all whom it may concern:*

Be it known that I, PETER WERTZ, a citizen of the United States, and a resident of Pittsburgh, in the county of Allegheny and State of Pennsylvania, have invented a new and useful Improvement in Safety Locomotive-Cab Valves, of which the following is a specification.

This invention relates to valves and particularly to valves adapted to be used in connection with the boilers of locomotives.

It has been found that many of the valves heretofore used as blow-off valves, gage valves, and gage glass valves are not constructed so as to prevent the escape of steam or water from the boiler in the event of rupture of the valve body or actuating parts thereof. In case of wrecks the rupture of the valve casings within the locomotive cab frequently results in the escape of steam and water, scalding the engineer and other operatives therein.

It is an object of the invention to provide a device in which the valve head will be seated by the pressure within the boiler to prevent escape therefrom in case the valve casing or the actuating means are disrupted or broken off. Other objects are to provide a device in which the valve head is normally seated by the pressure of the fluid controlled which is provided with means for dislodging foreign matter to effect cleaning of the passage through the valve body, and in which a single actuating means is employed to open the valve and to lock the same to its seat. It is also a further object to provide a valve which is particularly adapted for a gage glass valve in which the valve will be automatically closed in case of breakage of the gage glass to prevent the escape of water or steam under such circumstances.

In the accompanying drawings Fig. 1 is a longitudinal sectional view through a globe valve embodying the invention; Fig. 2 is an elevation showing a gage valve to which the invention is applied; Fig. 3 shows a modified form of the invention adapted as a gage glass valve; and Fig. 4 is a transverse section taken on the line IV—IV of Fig. 1.

The valve comprises a body 1 formed with the threaded inlet nipple 2 and the oppositely disposed actuating nipple 3 and having the usual boss 4 to which the discharge pipe is adapted to be connected. The fluid passage 5 extends through the inlet nipple 2 into the body 1. A valve seat 6 is formed on the end of the nipple 2 with which a valve head 7 on the rod 8 cooperates, said rod extending through the passage 5, body 1, and nipple 3, projecting a short distance beyond the latter. The portion of the rod 8 disposed within the passage 5 is substantially triangular in shape as clearly shown in Fig. 4 so as to provide the cleaning wings 9 and at the same time provide the passages 10 for the passage of the fluid.

The portion of the valve rod projecting beyond the nipple 3 is provided with a reduced portion forming a shoulder or abutment 11. A cap 12 having a suitable packing 13 slides on such reduced portion and its inner face is adapted to abut the shoulder 11 to unseat the valve head 7, the cap being threaded upon the nipple 3 as indicated at 14. Surrounding the rod is a sealing washer 15 spaced from the inner face of cap so as to form a pressure chamber 16, which abuts the end of the nipple, as shown at 17, and contacts at its periphery with the internal threads of the cap. Pressure fluid passes between the washer and stem into the chamber 16 and so prevents leakage between the cap and the nipple. Fixed to the reduced portion beyond the cap and spaced a short distance therefrom is a head 18 which is contacted by the cap to lock the valve to its seat when the cap is moved a sufficient distance towards the right. The distance between the shoulder 11 and head 18 is slightly greater than the thickness of that portion of the cap surrounding the rod so that the cap will have a sliding movement on the rod and thus provide a lost motion connection between the cap and rod. In order to actuate the valve the cap is flared outwardly to form a hand wheel 19 which may be gripped so as to readily turn the same. The head 18 is made non-circular in cross section so as to be engaged by a wrench or other suitable tool adapted to rotate the rod 8 to move the wings 9 for cleaning the passage 5.

The valve thus described, and as illustrated in Fig. 1, is in the form of an ordinary globe valve adapted for general purposes. Instead of boss 4 the reduced nipple such as shown at 20, Fig. 2, may be employed, thus adapting the device as a gage valve.

Fig. 3 illustrates a modified form of valve particularly adapted for use as a gage glass valve, the boiler sheet being indicated at 21 and the gage glass at 22. In this form the construction is identical with that previously described with the exception that the nipple 3 is provided with a special form of threaded connection comprising the single spiral groove 23 forming the female portion with which the correspondingly shaped male portion 24 on the cap 12 engages. The inclination of the groove is such that under normal conditions the cap will hold the valve off its seat but should the pressure within the casing 1 becomes suddenly reduced, as by breakage of the gage glass, the pressure upon the head of the valve will cause the cap to rotate and lock the valve to its seat. A plurality of very steep threads, however, may be used instead of the form just described, if desired.

In order to open the valve, cap 12 is screwed upon the nipple 3 by turning hand wheel 19 until the inner surface of the cap abuts the shoulder 11, thus forcing the head 7 off its seat and permitting fluid to pass through the passages 10 around the valve rod. Unscrewing of the cap 12 allows the valve head to seat under the pressure of the fluid acting thereupon. By unscrewing the cap a sufficient distance, after the valve is seated by the pressure, to bring its outer face into contact with the head 18, the valve may be positively locked to its seat. As before stated, the packing 13 prevents leakage through the top of the cap and pressure fluid within the chamber 16 forces the sealing washer 15 against the end 17 of nipple 3 and the internal threads of the cap, preventing the escape of fluid around the threads 14. Whenever it is desired to dislodge any sediment collected in the passage 5 all that is necessary is to rotate the head 18 which in turn causes rotation of cleaning wings 9, effectively cleaning the passage 5.

In the forms shown in Figs. 1 and 2, should the body 1 become disruptured or the entire actuating means be torn away, as long as the seating portion of nipple 2 remains intact, pressure upon the head 7 will force the same tightly upon its seat, preventing escape of fluid therethrough.

When the valve shown in Fig. 3 is employed in connection with the gage glass, in the event that the glass should become broken, pressure within the body 1 would be reduced, permitting the pressure upon the valve head to overcome the friction between the male and female parts and rotate the cap 12, thus seating the valve and preventing escape of the fluid through the same.

It is thus seen that the invention provides a very compact, sturdy, and simple construction in which the valve is seated by pressure of the fluid controlled which can be easily cleaned without disassembly of the parts, which prevents escape of fluid in case the valve body and actuating means be torn away in a wreck and one in which the valve is automatically seated when used as a gage glass valve.

I claim:

1. A valve comprising a casing provided with a passage therethrough, oppositely extending threaded nipples thereon, a valve seat formed at the extremity of one of said nipples, a rod having cleaning wings fitting the said passage and formed with a valve head at one end cooperating with the seat and projecting beyond and through an opening in a cap threaded on the other nipple, said rod having a shoulder against which the cap abuts to open the valve, and a head on the rod beyond the cap with which the cap contacts to lock the valve to its seat, the distance between said shoulder and head being greater than the thickness of the cap to provide a lost motion connection between the cap and rod.

2. A valve comprising a casing provided with a passage therethrough, an inlet nipple and an oppositely disposed nipple thereon, a valve seat at the extremity of said inlet nipple, a cap threaded on the second-mentioned nipple, a rod having a valve head cooperating with said seat and extending through said nipples and an opening in said cap, the portion of the rod within the inlet nipple being of non-circular cross section to form cleaning wings fitting the same, a shoulder on the rod within the cap, a head thereon beyond the cap, the distance between the shoulder and head being sufficient to provide a lost motion connection between the rod and cap, said head being irregular in shape so as to be readily turned to rotate the rod.

3. A valve comprising a casing provided with a passage therethrough, oppositely extending nipples thereon, a valve seat formed at the extremity of one of said nipples, a rod having a valve head at one end cooperating with the seat and projecting beyond and through an opening in a cap threadedly connected with the last named nipple, said rod having a shoulder against which the cap abuts to open the valve, and a head on the rod beyond the cap with which the cap contacts to lock the valve to its seat, the distance between the said shoulder and head being greater than the thickness of the cap to provide a lost motion connection between the cap and rod, the inclination of the parts forming the threaded connection between the cap and said nipple being comparatively steep whereby pressure of fluid upon the head of the valve in substantial excess of pressure within the casing will rotate the cap and seat the valve.

4. A valve comprising a casing provided with a passage therethrough, an inlet nipple, an exteriorly threaded nipple opposite the inlet nipple, a valve seat formed at the extremity of the inlet nipple, a rod extending through the said nipple and provided with a valve head cooperating with the said seat and projecting through an opening in a valve actuating cap threaded on the second named nipple, a sealing washer encircling the rod within and spaced from the bottom wall of the cap and abutting the extremity of said second named nipple and the threads of the cap to form a pressure chamber between the cap and nipple, an abutment on the rod within the cap against which the cap abuts to open the valve, and a head on the end of the rod beyond and spaced from the cap adapted to be contacted by the cap to lock the valve to its seat.

In testimony whereof, I sign my name.

PETER WERTZ.

Witness:
EDWIN O. JOHNS.